United States Patent
Sahara

(10) Patent No.: US 9,277,557 B2
(45) Date of Patent: Mar. 1, 2016

(54) RADIO BASE STATION AND COMMUNICATION CONTROL METHOD

(75) Inventor: Toru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 39 days.

(21) Appl. No.: 13/807,261

(22) PCT Filed: Jun. 28, 2011

(86) PCT No.: PCT/JP2011/064837
§ 371 (c)(1),
(2), (4) Date: Dec. 27, 2012

(87) PCT Pub. No.: WO2012/002403
PCT Pub. Date: Jan. 5, 2012

(65) Prior Publication Data
US 2013/0100927 A1    Apr. 25, 2013

(30) Foreign Application Priority Data

Jun. 28, 2010  (JP) ................................. 2010-146977
Jun. 28, 2010  (JP) ................................. 2010-146978

(51) Int. Cl.
*H04W 4/00*      (2009.01)
*H04W 72/04*    (2009.01)
*H04B 7/08*      (2006.01)
(Continued)

(52) U.S. Cl.
CPC ......... *H04W 72/0453* (2013.01); *H04B 7/0842* (2013.01); *H04L 25/03159* (2013.01); *H04W 72/0446* (2013.01); *H04B 7/0615* (2013.01)

(58) Field of Classification Search
CPC ................................................ H04W 72/0453
USPC ........................................................ 370/330
See application file for complete search history.

(56) References Cited

U.S. PATENT DOCUMENTS 5,586,122 A * 12/1996 Suzuki et al. .................. 370/347
6,087,986 A *  7/2000 Shoki et al. .................... 342/383
6,728,294 B1  4/2004 Kohno et al.
(Continued)

FOREIGN PATENT DOCUMENTS

JP  2000-332668 A  11/2000
JP  2008-219625 A   9/2008
(Continued)

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8).
(Continued)

*Primary Examiner* — Maharishi Khirodhar
(74) *Attorney, Agent, or Firm* — Studebaker & Brackett PC

(57) ABSTRACT

A radio base station (eNB1), when having received an upstream radio signal of a radio frequency band from a radio terminal (UE2), calculates, based on a demodulation reference signal included in the upstream radio signal, and stores reception weights of antennas (108A to 108D). The radio base station (eNB1) further sets, as the transmission weight of each of the antennas (108A to 108D), that one of the stored reception weights of the antennas (108A to 108D) which was calculated during a past given interval and which corresponds to a frequency band that is the nearest to the frequency band of a PDSCH that is a target for setting.

15 Claims, 12 Drawing Sheets

(51) Int. Cl.
*H04L 25/03* (2006.01)
*H04B 7/06* (2006.01)

(56) References Cited

U.S. PATENT DOCUMENTS

| | | | |
|---|---|---|---|
| 6,822,607 B2* | 11/2004 | Tanaka et al. | 342/377 |
| 7,133,680 B2* | 11/2006 | Crisan | 455/450 |
| 7,778,211 B2* | 8/2010 | Hedayat et al. | 370/310 |
| 8,306,001 B2* | 11/2012 | Wang et al. | 370/335 |
| 2005/0136980 A1* | 6/2005 | Kim et al. | 455/562.1 |
| 2006/0281494 A1* | 12/2006 | Wilson et al. | 455/562.1 |
| 2008/0304446 A1 | 12/2008 | Kimura et al. | |
| 2011/0305212 A1 | 12/2011 | Miyatake et al. | |

FOREIGN PATENT DOCUMENTS

| | | |
|---|---|---|
| WO | 2006/075386 A1 | 7/2006 |
| WO | 2010/061768 A1 | 6/2010 |

OTHER PUBLICATIONS

International Search Report; PCT/JP2011/064837; Aug. 16, 2011.
An Office Action; "Notice of Reason for Rejection," issued by the Japanese Patent Office on Jan. 28, 2014, which corresponds to Japanese Patent Application No. 2010-146978 and is related to U.S. Appl. No. 13/807,261; with English language statement of relevance.
An Office Action; "Notice of Reasons for Rejection," issued by the Japanese Patent Office on Apr. 15, 2014, which corresponds to Japanese Patent Application No. 2010-146977 and is related to U.S. Appl. No. 13/807,261; with English language statement of relevance.

* cited by examiner

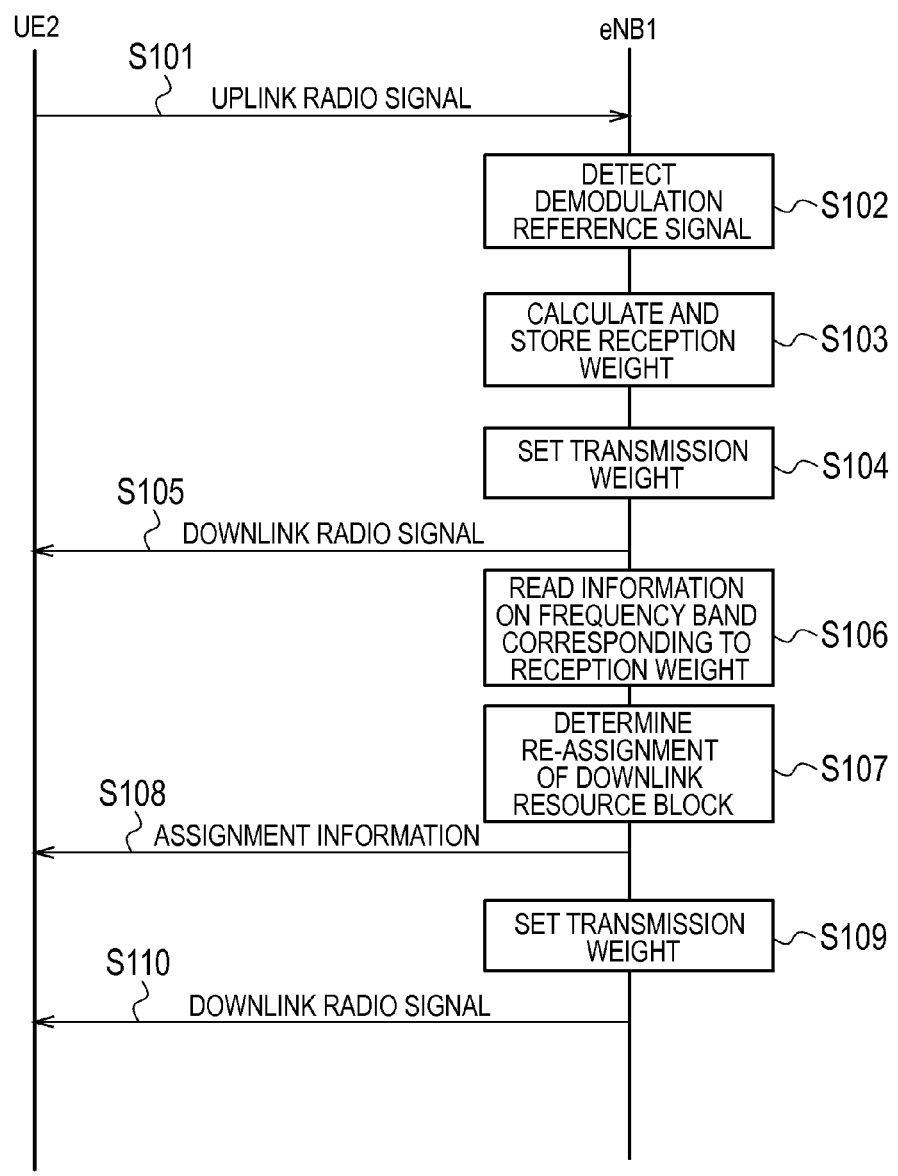

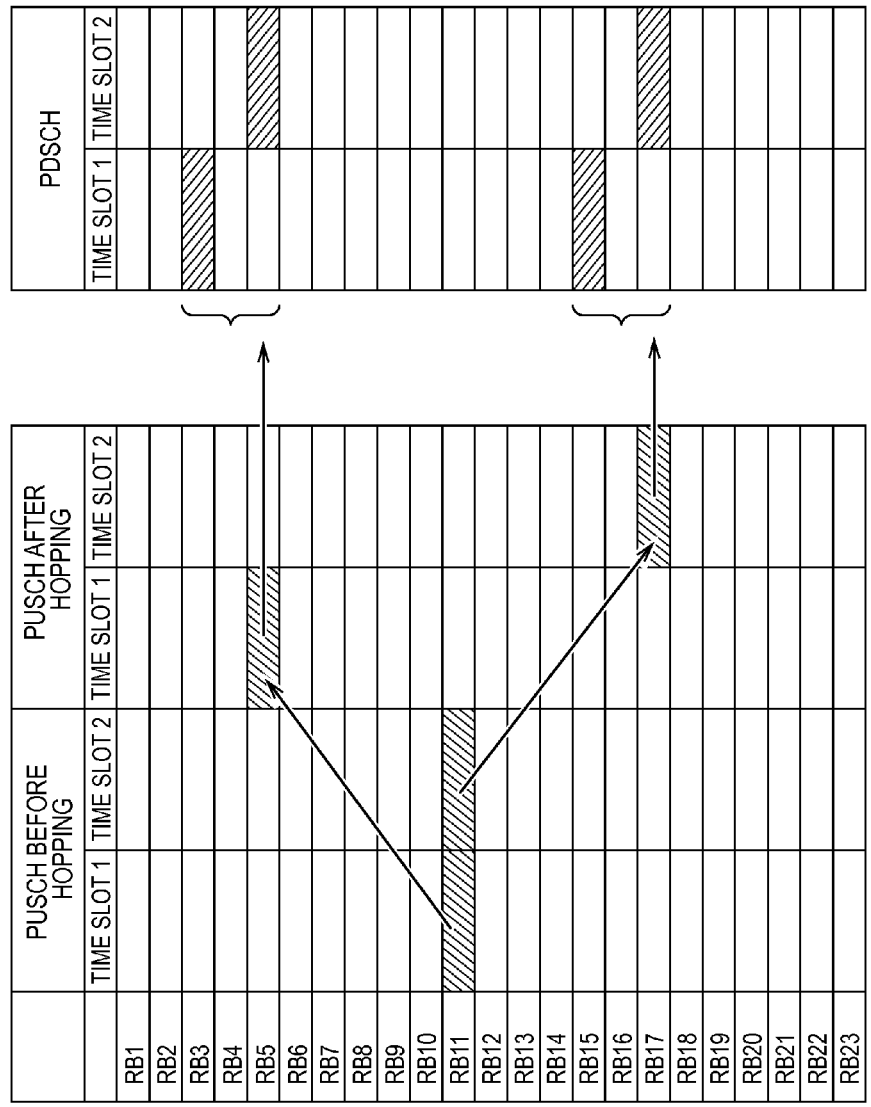

RADIO BASE STATION AND COMMUNICATION CONTROL METHOD

TECHNICAL FIELD

The present invention relates to a radio base station that transmits and receives a radio signal to and from a radio terminal using a plurality of antennas, and a communication control method in the radio base station.

BACKGROUND ART

In 3GPP (Third Generation Partnership Project), according to a radio communication system corresponding to LTE (Long Term Evolution) having a standard being currently designed, a radio base station eNB performs assignment of a radio resource in radio communication between the radio base station eNB and a radio terminal UE (for example, refer to Non Patent Literature 1). Furthermore, in the radio communication system corresponding to the LTE, one of FDD (Frequency Division Duplex) and TDD (Time Division Duplex) is employed in the radio communication between the radio base station eNB and the radio terminal UE.

Moreover, in an LTE (TDD-LTE) radio communication system employing the TDD, there has been discussed a feature where the radio base station eNB performs control for adaptively directing a beam (adaptive array control) toward the radio terminal UE at the time of transmission of a downlink radio signal, in order to ensure communication quality between a radio base station eNB and a radio terminal UE that is moving.

For example, in the next-generation PHS (XGP) radio communication system, a frequency band for a downlink radio signal assigned to a radio terminal is equal to a frequency band for an uplink radio signal. Thus, a radio base station is able to calculate an antenna weight for the downlink radio signal with the frequency band, which is equal to that of the uplink radio signal, on the basis of a propagation environment of the frequency band for the uplink radio signal, which is understood by the uplink radio signal from the radio terminal.

Meanwhile, in the TDD-LTE radio communication system, OFDMA (Orthogonal Frequency Division Multiplexing Access) is employed in downlink radio communication and SC-FDMA (Single Carrier Frequency Division Multiple Access) is employed in uplink radio communication. In these multiplexing schemes, a radio resource is arranged in two dimensions of a frequency and a time to realize user multiplexing, and there is a case in which a frequency band for a downlink radio signal assigned to a radio terminal UE is not equal to a frequency band for an uplink radio signal.

Therefore, when the uplink radio signal was received from a radio terminal UE, a radio base station eNB may not calculate an antenna weight for the downlink radio signal with the frequency band, which is equal to that of the uplink radio signal, on the basis of the propagation environment of the frequency band for the uplink radio signal.

CITATION LIST

Non Patent Literature

[Non Patent Literature 1] 3GPP TS 36.211 V8.7.0 "Physical Channels and Modulation" May, 2009

SUMMARY OF INVENTION

A first feature is summarized as a radio base station (radio base station eNB1) employing an adaptive array scheme, which transmits and receives a radio signal to and from a radio terminal (radio terminal UE2) using a plurality of antennas (antennas 108A to 108D), comprising: a calculation unit (AAS processing unit 126) that calculates antenna weights for each of a plurality of frequency bands, on the basis of respective reference signals of each of the plurality of frequency bands in an uplink radio signal; and a setting unit (AAS processing unit 136) that sets an antenna weight for a frequency band to be used in a downlink radio signal, wherein the setting unit sets an antenna weight, which corresponds to a frequency band in which the corresponding frequency band is closest to the frequency band to be used in the downlink radio signal among the antenna weights calculated by the calculation unit, in the frequency band to be used in the downlink radio signal.

According to the above feature, the radio base station calculates the antenna weights for each of the plurality of frequency bands, on the basis of respective reference signals for each of the plurality of frequency bands in an uplink radio signal, and sets the antenna weight, which corresponds to a frequency band closest to a frequency band to be used in a downlink radio signal among the calculated antenna weights, in the frequency band to be used in the downlink radio signal. Consequently, even when a frequency band to be used in an uplink radio signal and the frequency band to be used in the downlink radio signal do not coincide with each other, a frequency band closest to the frequency band to be used in the downlink radio signal, in other words, an antenna weight of a frequency band, which is considered to have a propagation environment similar to that of the frequency band to be used in the downlink radio signal, is set in the frequency band to be used in the downlink radio signal, so that it is possible to suppress failure occurring in downlink radio communication and appropriate adaptive array is possible.

A second feature is summarized as that the calculation unit calculates the antenna weights for each of the plurality of frequency bands, on the basis of respective reference signals of each of the plurality of frequency bands belonging to a predetermined time zone in the uplink radio signal.

A third feature is summarized as that the predetermined time zone includes a former half time slot and a latter half time slot, and the calculation unit calculates an antenna weight of a frequency band corresponding to a first reference signal, on the basis of the first reference signal belonging to a time zone of the former half time slot in the uplink radio signal, and calculates an antenna weight of a frequency band corresponding to a second reference signal, on the basis of the second reference signal belonging to a time zone of the latter half time slot in the uplink radio signal.

A fourth feature is summarized as that the calculation unit calculates an antenna weight corresponding to a predetermined frequency band, on the basis of each of a plurality of reference signals belonging to the predetermined frequency band in a past predetermined period.

A fifth feature is summarized as that the setting unit sets a first antenna weight in a frequency band of a downlink radio signal corresponding to a first data stream, and sets a second antenna weight, in which a null is placed in a direction of a beam corresponding to the first antenna weight, in a frequency band of a downlink radio signal corresponding to a second data stream, when the radio terminal has one antenna and downlink radio communication is multi-stream communication.

A sixth feature is summarized as a communication control method used in a radio base station employing an adaptive array scheme, which transmits and receives a radio signal to and from a radio terminal using a plurality of antennas, comprising the steps of: calculating antenna weights for each of a plurality of frequency bands in an uplink radio signal based on respective reference signals of each of the plurality of frequency bands; and setting an antenna weight in a frequency band to be used in a downlink radio signal, wherein in the setting of the antenna weight, an antenna weight, which corresponds to a frequency band in which the corresponding frequency band is closest to the frequency band to be used in the downlink radio signal among the calculated antenna weights, is set in the frequency band to be used in the downlink radio signal.

A seventh feature is summarized as that a radio base station (radio base station eNB1) employing an adaptive array scheme, which transmits and receives a radio signal to and from a radio terminal (radio signal UE2) using a plurality of antennas (antennas 108A to 108D), comprising: a calculation unit (AAS processing unit 126) that calculates antenna weights for each of a plurality of frequency bands, on the basis of respective reference signals of each of the plurality of frequency bands in an uplink radio signal; and an assignment unit (RB assignment unit 120) that assigns a frequency band to be used in a downlink radio signal, wherein the assignment unit sets a higher priority to a frequency band assigned to be used in the downlink radio signal, as the frequency band is closer to the frequency band for which the antenna weight has been calculated by the calculation unit.

According to the above feature, the radio base station calculates the antenna weights for each of the plurality of frequency bands, on the basis of respective reference signals for each of the plurality of frequency bands in an uplink radio signal, and sets a higher priority to the frequency band assigned to be used in the downlink radio signal, as the frequency band is closer to the frequency band for which the antenna weight was calculated. Accordingly, it is possible to bring the frequency band used in the downlink radio signal close, as much as possible, to the frequency band for which the antenna weight was calculated, so that a propagation environment of the frequency band for which the antenna weight was calculated approximates to a propagation environment of the frequency band to be used in the downlink radio signal. Consequently, even when the calculated antenna weight is set in the frequency band to be used in the downlink radio signal, it is possible to suppress failure occurring in downlink radio communication and appropriate adaptive array is possible.

An eighth feature is summarized as the radio base station comprising: a setting unit (AAS processing unit 136) that sets an antenna weight for the frequency band to be used in the downlink radio signal, wherein the setting unit sets an antenna weight, which corresponds to a frequency band in which the corresponding frequency band is closest to the frequency band to be used in the downlink radio signal assigned by the assignment unit among the antenna weights calculated by the calculation unit, in the frequency band to be used in the downlink radio signal assigned by the assignment unit.

A ninth feature is summarized as that the calculation unit calculates the antenna weights for each of a plurality of frequency bands, on the basis of respective reference signals of each of the plurality of frequency bands belonging to a predetermined time zone in the uplink radio signal.

A tenth feature is summarized as that the predetermined time zone includes a former half time slot and a latter half time slot, and the calculation unit calculates an antenna weight of a frequency band corresponding to a first reference signal, on the basis of the first reference signal belonging to a time zone of the former half time slot in the uplink radio signal, and calculates an antenna weight of a frequency band corresponding to a second reference signal, on the basis of the second reference signal belonging to a time zone of the latter half time slot in the uplink radio signal.

An eleventh feature is summarized as that the calculation unit calculates an antenna weight corresponding to a predetermined frequency band, based on each of a plurality of reference signals belonging to the predetermined frequency band in a past predetermined period.

A twelfth feature is summarized as that the setting unit sets a first antenna weight in a frequency band of a downlink radio signal corresponding to a first data stream, and sets a second antenna weight, in which a null is placed in a direction of a beam corresponding to the first antenna weight, in a frequency band of a downlink radio signal corresponding to a second data stream, when the radio terminal has one antenna and downlink radio communication is multi-stream communication.

A thirteenth feature is summarized as a communication control method used in a radio base station employing an adaptive array scheme, which transmits and receives a radio signal to and from a radio terminal using a plurality of antennas, comprising the steps of: calculating antenna weights for each of a plurality of frequency bands in an uplink radio signal based on respective reference signals of each of the plurality of frequency bands; and assigning a frequency band to be used in a downlink radio signal, wherein in the step of assigning the frequency band, increasing a priority to a frequency band assigned to be used in the downlink radio signal, as the frequency band is closer to the frequency band for which the antenna weight has been calculated.

BRIEF DESCRIPTION OF DRAWINGS

FIG. 11 is a sequence diagram illustrating a time slot assignment operation according to the second embodiment.

FIG. 12 is a diagram illustrating an example of a correspondence relation between a reception weight corresponding to PUSCH and a transmission weight corresponding to PDSCH according to the second embodiment.

DESCRIPTION OF EMBODIMENTS

First Embodiment

Figure 1:
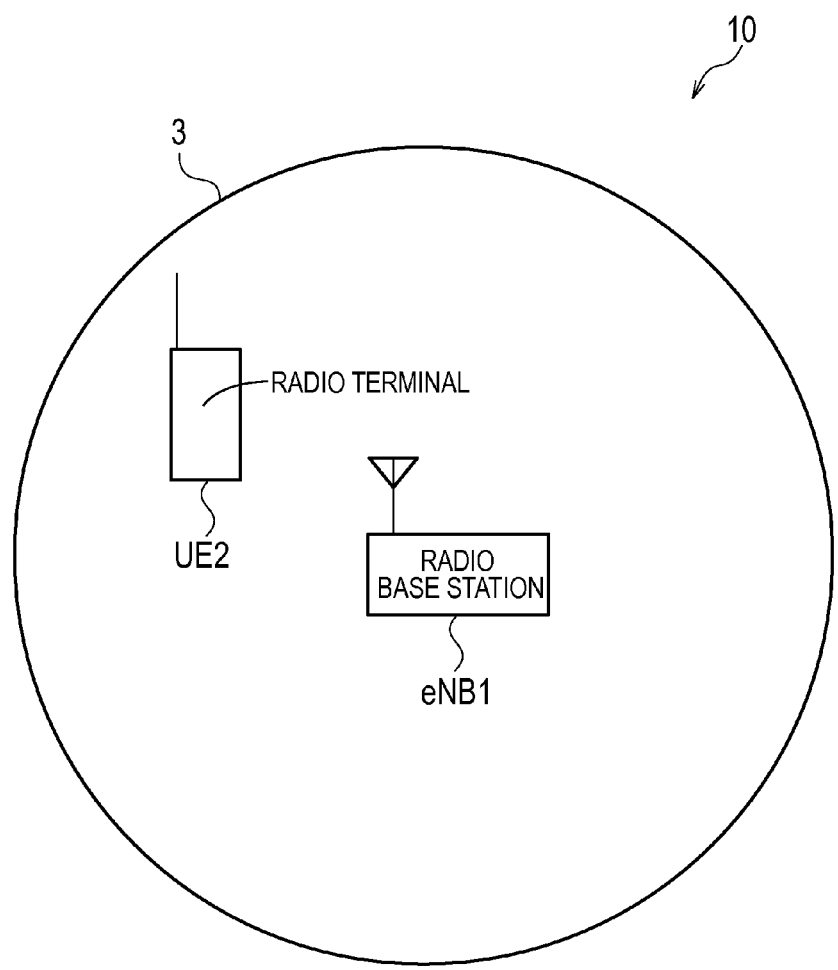
FIG. 1 is an entire schematic configuration diagram of a radio communication system according to a first embodiment.

Next, a first embodiment will be described with reference to the drawings. Specifically, (1.1) Configuration of radio communication system, (1.2) Operation of radio communication system, and (1.3) Operation and effect will be described. It is to be noted that the same or similar reference numerals are applied to the same or similar parts through the drawings in the following embodiments.

(1.1) Configuration of Radio Communication System

Firstly, a configuration of a radio communication system according to the first embodiment will be described in the sequence of (1.1.1) Entire schematic configuration of radio communication system, (1.1.2) Configuration of radio base station, and (1.1.3) Configuration of radio terminal.

(1.1.1) Entire Schematic Configuration of Radio Communication System

FIG. 1 is an entire schematic configuration diagram of a radio communication system 10 according to the first embodiment.

The radio communication system 10 illustrated in FIG. 1 is a TDD-LTE radio communication system. The radio communication system 10 includes a radio base station eNB1 and a radio terminal UE2. In FIG. 1, the radio base station eNB1 constitutes E-UTRAN (Evolved-UMTS Terrestrial Radio Access Network) together with another radio base station eNB (not illustrated). The radio terminal UE2 exists in a cell 3 that is a communication available area provided by the radio base station eNB1. In addition, FIG. 1 illustrates only one radio terminal UE2. However, actually, a plurality of radio terminals UE2 exist in the cell 3.

Time division duplex is employed in radio communication between the radio base station eNB1 and the radio terminal UE2, OFDMA (Orthogonal Frequency Division Multiplexing Access) is employed in downlink radio communication, and SC-FDMA (Single Carrier Frequency Division Multiple Access) is employed in uplink radio communication. Furthermore, downlink indicates a direction from the radio base station eNB1 to the radio terminal UE2, and uplink indicates a direction from the radio terminal UE2 to the radio base station eNB1.

The radio base station eNB1 assigns a resource block (RB) to the radio terminal UE2 in the cell 3 as a radio resource.

The resource block includes a downlink resource block (downlink RB) to be used in the downlink radio communication and an uplink resource block (uplink RB) to be used in the uplink radio communication. A plurality of downlink resource blocks are arranged in a frequency direction. Similarly, a plurality of uplink resource blocks are arranged in the frequency direction.

The downlink resource block includes a control information channel (PDCCH: Physical Downlink Control CHannel) for transmitting downlink control information, and a shared data channel (PDSCH: Physical Downlink Shared CHannel) for transmitting downlink user data in a time direction.

Meanwhile, the uplink resource block includes a control information channel (PUCCH: Physical Uplink Control CHannel) for transmitting uplink control information at both ends of an entire frequency band available in the uplink radio communication, and a shared data channel (PUSCH: Physical Uplink Shared CHannel) for transmitting uplink user data at the center part thereof.

At the time of assignment of the resource block, frequency hopping is applied to change a frequency to be assigned according to a predetermined frequency hopping pattern.

Hereinafter, a description will be provided for a case in which radio communication is performed between the radio base station eNB1 and one radio terminal UE. In addition, it is assumed that the downlink resource block and the uplink resource block are assigned to the radio terminal UE2 in an initial state.

(1.1.2) Configuration of Radio Base Station

Figure 2:
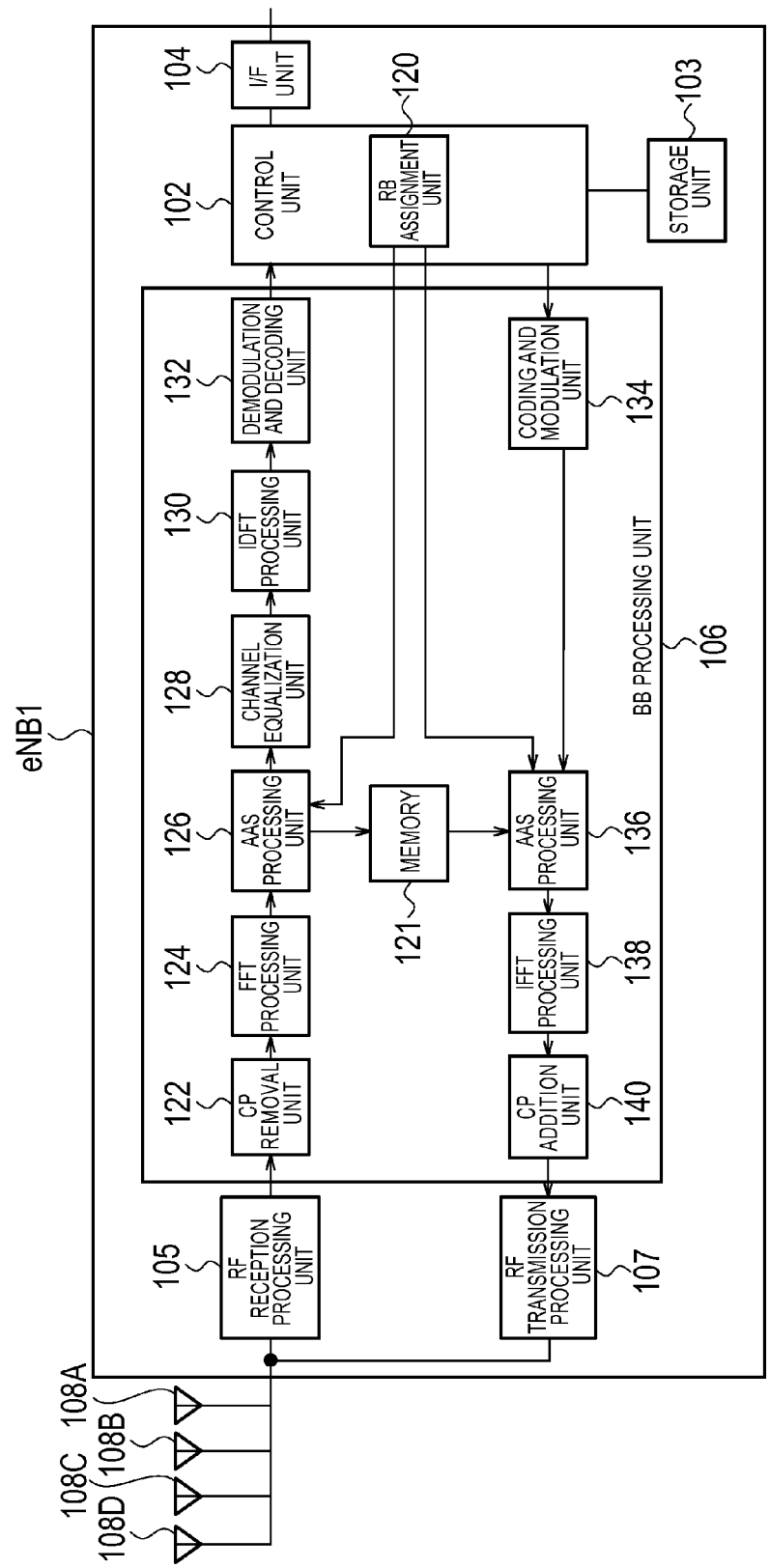
FIG. 2 is a configuration diagram of a radio base station according to the first embodiment.

FIG. 2 is a configuration diagram of the radio base station eNB1. As illustrated in FIG. 2, the radio base station eNB1 is an adaptive array scheme, and includes a control unit 102, a storage unit 103, an I/F unit 104, a radio frequency (RF) reception processing unit 105, a base band (BB) processing unit 106, a RF transmission processing unit 107, an antenna 108A, an antenna 108B, an antenna 108C, and an antenna 108D.

The control unit 102 is configured, for example, by a CPU, and controls various functions of the radio base station eNB1. The control unit 102 includes a RB assignment unit 120. The storage unit 103 is configured, for example, by a memory, and stores various types of information used for the control and the like of the radio base station eNB1. The I/F unit 104 is able to communicate with another radio base station eNB through an X1 interface. Furthermore, the I/F unit 104 is able to communicate with EPC (Evolved Packet Core), specifically, MME (Mobility Management Entity)/S-GW (Serving Gateway), through an S1 interface.

The RF reception processing unit 105 receives an uplink radio signal of a radio frequency band from the radio terminal UE2 through the antenna 108A to the antenna 108D. The RF reception processing unit 105 has LNA (Low Noise Amplifier) (not illustrated) and a mixer (not illustrated) therein. The RF reception processing unit 105 amplifies the received uplink radio signal of a radio frequency band, and converts (down-converts) the amplified signal to a base band signal. Moreover, the RF reception processing unit 105 outputs the base band signal to the BB processing unit 106.

The BB processing unit 106 includes a memory 121, a CP (Cyclic Prefix) removal unit 122, a FFT (Fast Fourier Transform) processing unit 124, an AAS (Adaptive Array System) processing unit 126, a channel equalization unit 128, an IDFT (Inverse Discrete Fourier Transform) processing unit 130, a demodulation and decoding unit 132, a coding and modulation unit 134, an AAS processing unit 136, an IFFT (Inverse Fast Fourier Transform) processing unit 138, and a CP addition unit 140.

The RB assignment unit 120 of the control unit 102 acquires an assignment value (an RB assignment value) of a resource block, which is acquired by a process of a MAC (Media Access Control) layer, in the control unit 102. The RB assignment value includes a resource block number that is identification information of a downlink resource block and an uplink resource block to be assigned to the radio terminal UE2. The RB assignment unit 120 outputs the RB assignment value to the AAS processing unit 126 and the AAS processing unit 136.

The CP removal unit 122 removes CP (Cyclic Prefix) from an input base band signal. The CP indicates duplication of an end part of an OFDM symbol, and is included in a period of a guard interval provided in order to suppress inter-symbol interference occurring by a multi-path. The FFT processing unit 124 performs fast Fourier transform on the base band signal having no CP, thereby acquiring frequency domain signals.

The AAS processing unit 126 calculates an antenna weight (a reception weight), in which a signal-to-interference noise ratio (SINR) is maximum at the time of reception of an uplink radio signal from the radio terminal UE2, with respect to each of the antenna 108A to the antenna 108D, on the basis of the frequency domain signals.

Figure 3:
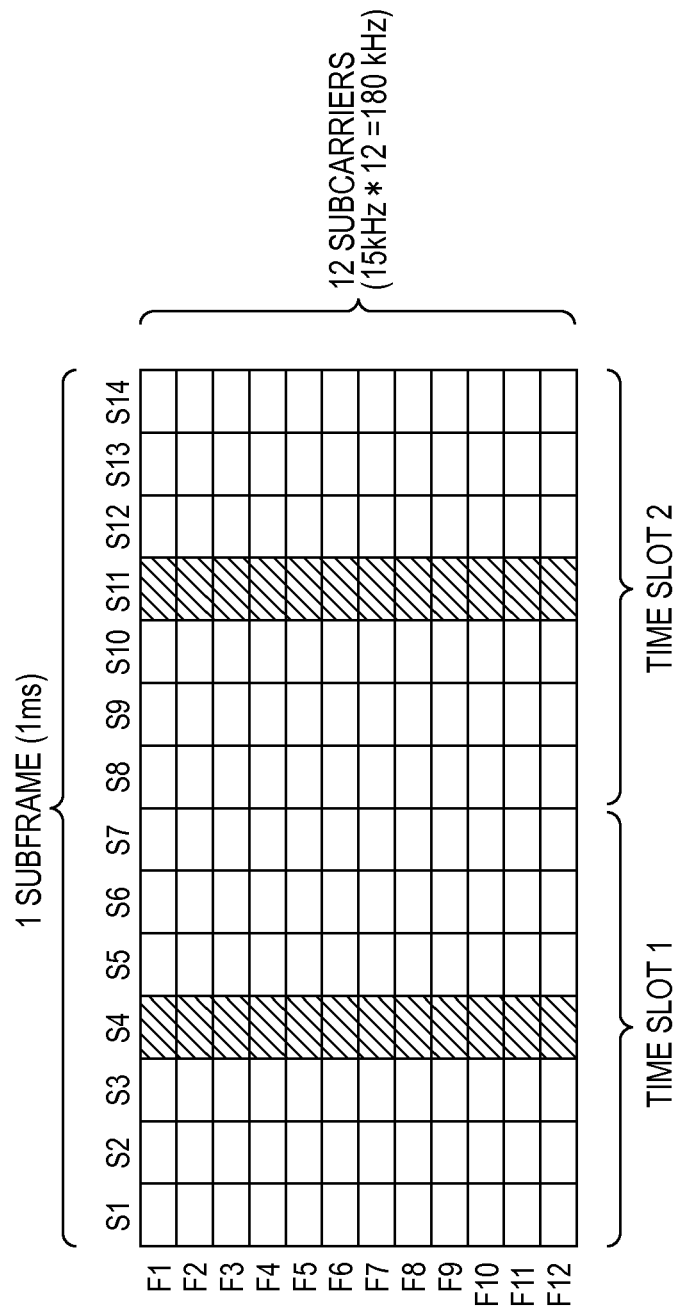
FIG. 3 is a diagram illustrating a format of PUSCH according to the first embodiment.

FIG. 3 is a diagram illustrating a format of PUSCH. As illustrated in FIG. 3, the PUSCH includes one subframe having a time length of 1 [ms] in a time direction. The subframe includes a time zone 51 to a time zone S14. Among the time zone 51 to the time zone S14, the time zone S1 to the time zone S7 constitute a former half time slot (a time slot 1) and the time zone S8 to the time zone S14 constitute a latter half time slot (a time slot 2). The central time zone S4 in the time slot 1 is used for transmitting DRS (Demodulation Reference Signal). Similarly, the central time zone S11 in the time slot 2 is used for transmitting the demodulation reference signal.

When setting the demodulation reference signal, a Zaddoff-Chu sequence, which has small amplitude variation in a frequency direction and a time direction, is employed. The demodulation reference signal is different in each cell, and mutual correlation of the demodulation reference signal between cells is designed to be small.

Furthermore, as illustrated in FIG. 3, the PUSCH has a frequency width of 180 [kHz] in the frequency direction. Furthermore, the PUSCH includes 12 subcarriers F1 to F12 having a frequency width of 15 [kHz].

Specifically, the AAS processing unit 126 designates a frequency band of an uplink resource block assigned to the radio terminal UE2, on the basis of the RB assignment value. Moreover, the AAS processing unit 126 detects a demodulation reference signal included in a frequency domain signal corresponding to the designated frequency band of the uplink resource block. Moreover, the AAS processing unit 126 calculates reception weights of the antenna 108A to the antenna 108D, which correspond to a frequency band of PUSCH in the uplink resource block assigned to the radio terminal UE2, on the basis of the demodulation reference signal.

As illustrated in FIG. 3, in one PUSCH, the demodulation reference signal is included in the time slot 1 and the time slot 2. Accordingly, the AAS processing unit 126 calculates two reception weights for a frequency band of one PUSCH. The AAS processing unit 126 stores the calculated reception weights in the memory 121 together with information on a corresponding frequency band and information (time stamp information) on a present time.

Moreover, the AAS processing unit 126 outputs a frequency domain signal, which corresponds to the frequency band of the uplink resource block assigned to the radio terminal UE2 among the frequency domain signals from the FFT processing unit 124, to the channel equalization unit 128.

The channel equalization unit 128 performs a channel equalization process on the input frequency domain signal. The IDFT processing unit 130 performs inverse discrete Fourier transform on the signal on which the channel equalization process was performed. The demodulation and decoding unit 132 performs demodulation and decoding processes on the signal on which the inverse discrete Fourier transform was performed. In this way, data transmitted by the radio terminal UE2 is obtained. The data is output to the control unit 102.

When the data is input from the control unit 102, the coding and modulation unit 134 performs coding and modulation on the data, thereby obtaining a frequency domain signal.

The AAS processing unit 136 sets an antenna weight (a transmission weight) at the time of transmission of a downlink radio signal to the radio terminal UE2 with respect to each of the antenna 108A to the antenna 108D.

Specifically, the AAS processing unit 136 designates a time zone and a frequency band of a downlink resource block assigned to the radio terminal UE2, on the basis of the RB assignment value. PDSCH in the designated downlink resource block is PDSCH to which the transmission weight is to be set.

Next, the AAS processing unit 136 extracts reception weights, in which a time indicated by the time stamp information is in a past predetermined period, from the reception weights corresponding to the antenna 108A to the antenna 108D and stored in the memory 121. The reception weight, in which the time indicated by the time stamp information is in the past predetermined period, indicates a reception weight calculated in the past predetermined period.

The AAS processing unit 136 designates a reception weight, in which a corresponding frequency band is closest to the frequency band of the PDSCH to be set, among the extracted reception weights. Moreover, the AAS processing unit 136 sets the designated reception weight of each of the antenna 108A to the antenna 108D, as the transmission weight of each of the antenna 108A to the antenna 108D, which corresponds to the frequency band of the PDSCH to which the transmission weight is to be set. The AAS processing unit 136 performs a weighting process to synthesize the set transmission weight with the frequency domain signal.

Furthermore, when there are a plurality of reception weights in which the corresponding frequency band is closest to the frequency band of the PDSCH to be set, the AAS processing unit 136 may set an average value of the plurality of reception weights as a transmission weight. Alternatively, the AAS processing unit 136 may set the latest one of the plurality of reception weights as a transmission weight.

In addition, when a frequency difference between the frequency band corresponding to the designated reception weight and the frequency band of the PDSCH to be set is equal to or more than a predetermined value, the AAS processing unit 136 may not set the transmission weights of the antenna 108A to the antenna 108D, which correspond to the frequency band of the PDSCH to which the transmission weight is to be set.

Furthermore, when the radio terminal UE2 has only one antenna and MIMO (Multi Input Multi Output) is employed in downlink radio communication as multi-stream communication, the AAS processing unit 136 performs the following process. That is, when precoding corresponding to the MIMO is performed in the coding and modulation unit 134, the AAS processing unit 136 uses a reception weight as a transmission weight (a first transmission weight) with respect to one layer, uses the reception weight as a second transmission weight perpendicular to the first transmission weight with respect to the other layer, and performs spatial division multiple access (SDMA) synthesis for the first/second transmission weights and a signal. For example, in the case in which the number of antenna elements is K in the radio base station eNB1 and the number of layers is two, when a first transmission weight of a Kth antenna element (an element (k)) calculated based on a reception weight is defined as WTX1($k$), a second transmission weight WTX2($k$) is obtained by Equation (1) below. However, a plurality of second transmission weights can be obtained by the number of the antenna elements in the radio base station eNB1. Synthesis of a signal X1 of a layer 1 and the first transmission weight WTX1($k$) of the element (k), and synthesis of a signal X2 of a layer 2 and the second transmission weight WTX2($k$) of the element (k) are performed by Equation (2) below, so that a synthesis weight is W($k$).

[Equation 1]

$$W_{TX2}(k) = \frac{W_{TX1}(k)}{|W_{TX1}(k)|} \exp\left(j * 2\pi * \frac{k}{K}\right) \quad \text{(Equation 1)}$$

[Equation 2]

$$W(k) = \frac{W_{TX1}(k) * X_1}{\sqrt{2}} + \frac{W_{TX2}(k) * X_2}{\sqrt{2}} \quad \text{(Equation 2)}$$

The AAS processing unit 136 outputs the weighted frequency domain signal to the IFFT processing unit 138.

The IFFT processing unit 138 performs inverse fast Fourier transform on the weighted frequency domain signal, thereby obtaining a base band signal. The CP addition unit 140 adds CP to the input base band signal. The CP addition unit 140 outputs the base band signal having the CP added thereto to the RF transmission processing unit 107.

The RF transmission processing unit 107 has a mixer (not illustrated) and a power amplifier (not illustrated) therein. The RF transmission processing unit 107 converts (up-converts) the base band signal having the CP added thereto to a downlink radio signal of a radio frequency band. Moreover, the RF transmission processing unit 107 amplifies the downlink radio signal of a radio frequency band, and transmits the amplified downlink radio signal of a radio frequency band through the antenna 108A to the antenna 108D in which the transmission weights are set.

(1.1.3) Configuration of Radio Terminal

Figure 4:
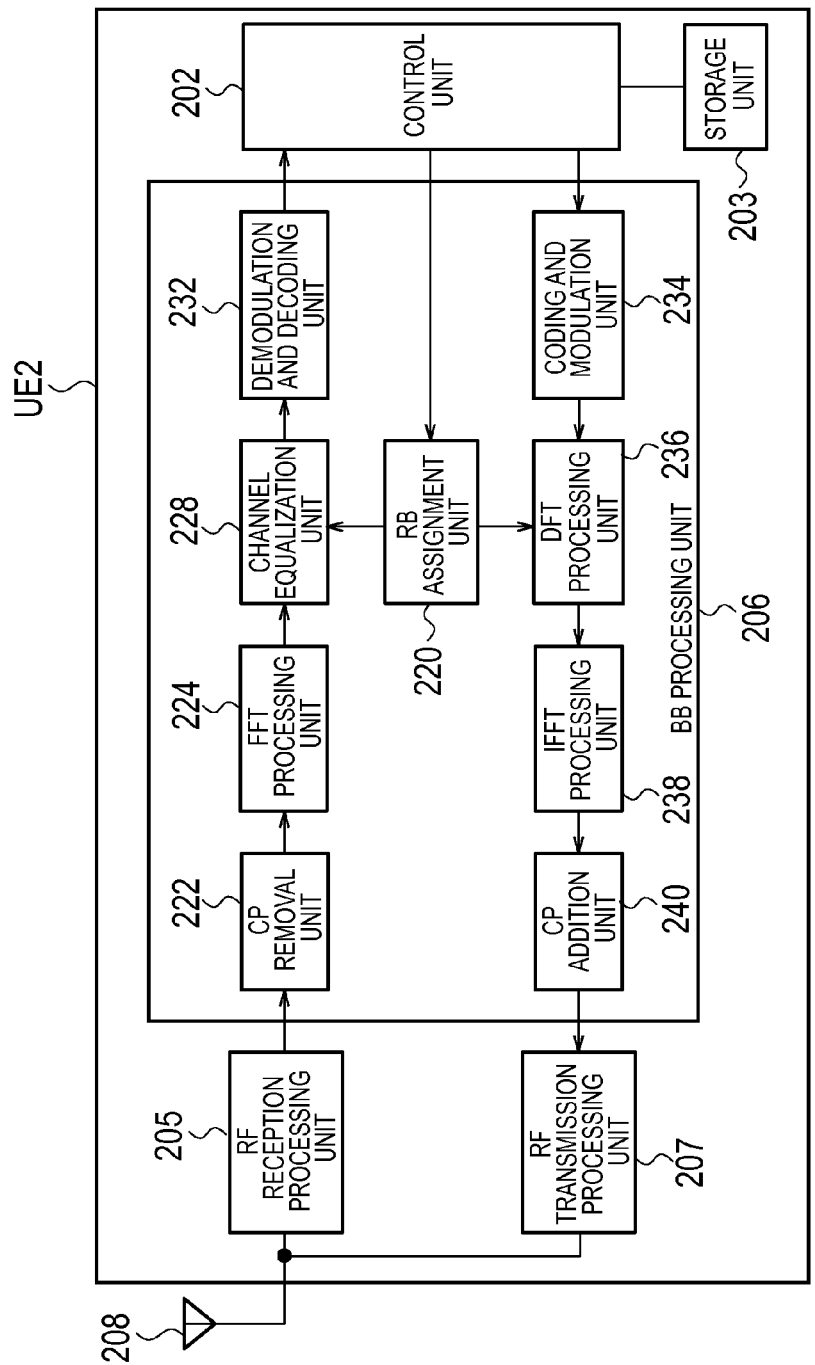
FIG. 4 is a configuration diagram of a radio terminal according to the first embodiment.

FIG. 4 is a configuration diagram of the radio terminal UE2. As illustrated in FIG. 4, the radio terminal UE2 includes a control unit 202, a storage unit 203, a radio frequency (RF) reception processing unit 205, a base band (BB) processing unit 206, a RF transmission processing unit 207, and an antenna 208.

The control unit 202 is configured, for example, by a CPU, and controls various functions of the radio terminal UE2. The storage unit 203 is configured, for example, by a memory, and stores various types of information used for the control and the like of the radio terminal UE2.

The RF reception processing unit 205 receives a downlink radio signal of a radio frequency band from the radio base station eNB1 through the antenna 208. The RF reception processing unit 205 has LNA (Low Noise Amplifier) (not illustrated) and a mixer (not illustrated) therein. The RF reception processing unit 205 amplifies the received downlink radio signal of a radio frequency band, and converts (down-converts) the amplified signal to a base band signal. Moreover, the RF reception processing unit 205 outputs the base band signal to the BB processing unit 206.

The BB processing unit 206 includes a RB assignment unit 220, a CP removal unit 222, a FFT processing unit 224, a channel equalization unit 228, a demodulation and decoding unit 232, a coding and modulation unit 234, a DFT processing unit 236, an IFFT processing unit 238, and a CP addition unit 240.

The RB assignment unit 220 receives an assignment value (an RB assignment value) of a resource block, which is acquired by a process of a MAC layer, in the control unit 202. The control unit 202 is able to recognize an assigned resource block, on the basis of assignment information of a resource block from the radio base station eNB1 when the radio terminal UE2 is connected to the radio base station eNB1. As described above, the RB assignment value includes a resource block number that is identification information of a downlink resource block and an uplink resource block to be assigned to the radio terminal UE2. The RB assignment unit 220 outputs the RB assignment value to the channel equalization unit 228 and the DFT processing unit 236.

The CP removal unit 222 removes CP from an input base band signal. The FFT processing unit 224 performs fast Fourier transform on the base band signal having no CP, thereby acquiring frequency domain signals.

The channel equalization unit 228 designates a frequency band of a downlink resource block assigned to the radio terminal UE2, on the basis of the RB assignment value from the RB assignment unit 220. Moreover, the channel equalization unit 228 performs a channel equalization process on a frequency domain signal, which corresponds to the frequency band of the downlink resource block assigned to the radio terminal UE2, among the frequency domain signals from the FFT processing unit 224. The demodulation and decoding unit 232 performs demodulation and decoding processes on the signal on which the channel equalization process was performed. In this way, data transmitted by the radio base station eNB1 is obtained. The data is output to the control unit 202.

When the data is input from the control unit 202, the coding and modulation unit 234 performs coding and modulation on the data, thereby obtaining a frequency domain signal. The DFT processing unit 236 designates a frequency band of an uplink resource block assigned to the radio terminal UE2, on the basis of the RB assignment value from the RB assignment unit 220. Moreover, the DFT processing unit 236 performs discrete Fourier transform on the frequency domain signal. The IFFT processing unit 238 performs inverse fast Fourier transform on the signal on which the discrete Fourier transform was performed, thereby obtaining a base band signal. The CP addition unit 240 adds CP to the input base band signal. The CP addition unit 240 outputs the base band signal having the CP added thereto to the RF transmission processing unit 207.

The RF transmission processing unit 207 has a mixer (not illustrated) and a power amplifier (not illustrated) therein. The RF transmission processing unit 207 converts (up-converts) the base band signal having the CP added thereto to an uplink radio signal of a radio frequency band. Moreover, the RF transmission processing unit 207 amplifies the uplink radio signal of a radio frequency band, and transmits the amplified uplink radio signal of a radio frequency band through the antenna 208.

(1.2) Operation of Radio Communication System

Figure 5:
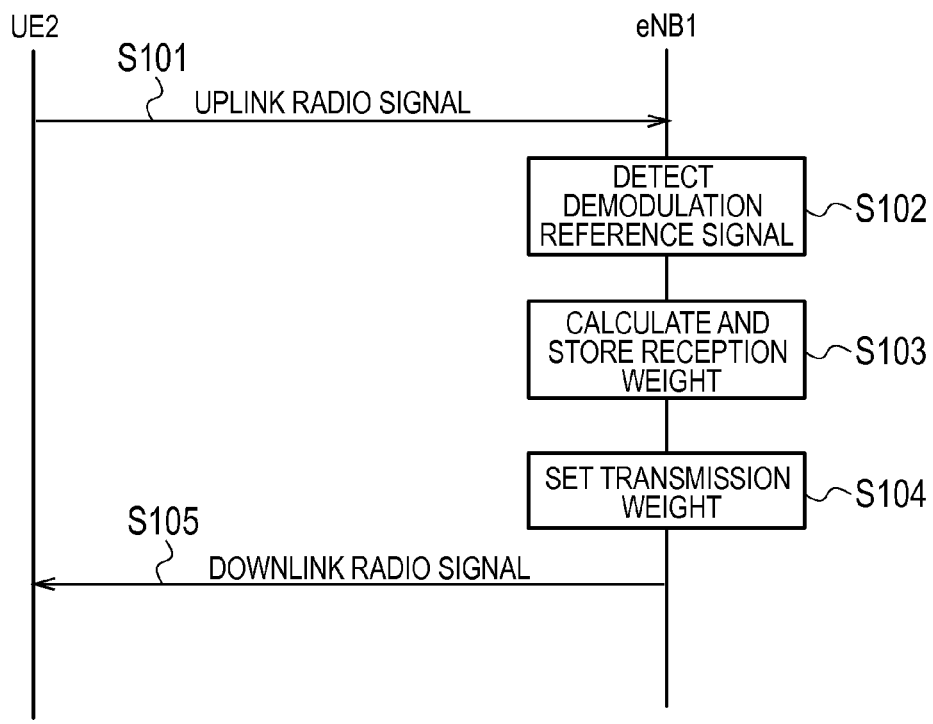
FIG. 5 is a sequence diagram illustrating a time slot assignment operation according to the first embodiment.

FIG. 5 is a sequence diagram illustrating the operation of the radio communication system 10. In step S101, the radio terminal UE2 transmits an uplink radio signal of a radio frequency band. The radio base station eNB1 receives the uplink radio signal of a radio frequency band.

In step S102, the radio base station eNB1 detects a demodulation reference signal included in the received uplink radio signal.

In step S103, the radio base station eNB1 calculates a reception weight of each of the antenna 108A to the antenna 108D, which correspond to the frequency band of PUSCH in an uplink resource block assigned to the radio terminal UE2, on the basis of the demodulation reference signal. Moreover, the radio base station eNB1 stores the calculated reception weights of the antenna 108A to the antenna 108D.

In step S104, the radio base station eNB1 designates a reception weight, in which a corresponding frequency band is closest to the frequency band of PDSCH to be set, among the stored reception weights of the antenna 108A to the antenna 108D, the reception weight being calculated in a past predetermined period. Moreover, the radio base station eNB1 sets the designated reception weight as the transmission weight of each of the antenna 108A to the antenna 108D.

In step S105, the radio base station eNB1 transmits a downlink radio signal of a radio frequency band from each of the antenna 108A to the antenna 108D in which the transmission weight is set. The radio terminal UE2 receives the downlink radio signal of a radio frequency band.

(1.3) Operation and Effect

As described above, according to the first embodiment, when an uplink radio signal of a radio frequency band is received from the radio terminal UE2, the radio base station eNB1 calculates and stores a reception weight of each of the antenna 108A to the antenna 108D, on the basis of a modulation reference signal included in the uplink radio signal. Moreover, the radio base station eNB1 sets a reception weight, in which a corresponding frequency band is closest to the frequency band of PDSCH to be set, among the stored reception weights of the antenna 108A to the antenna 108D, as a transmission weight of each of the antenna 108A to the antenna 108D, the reception weight being calculated in a past predetermined period.

Figure 6:
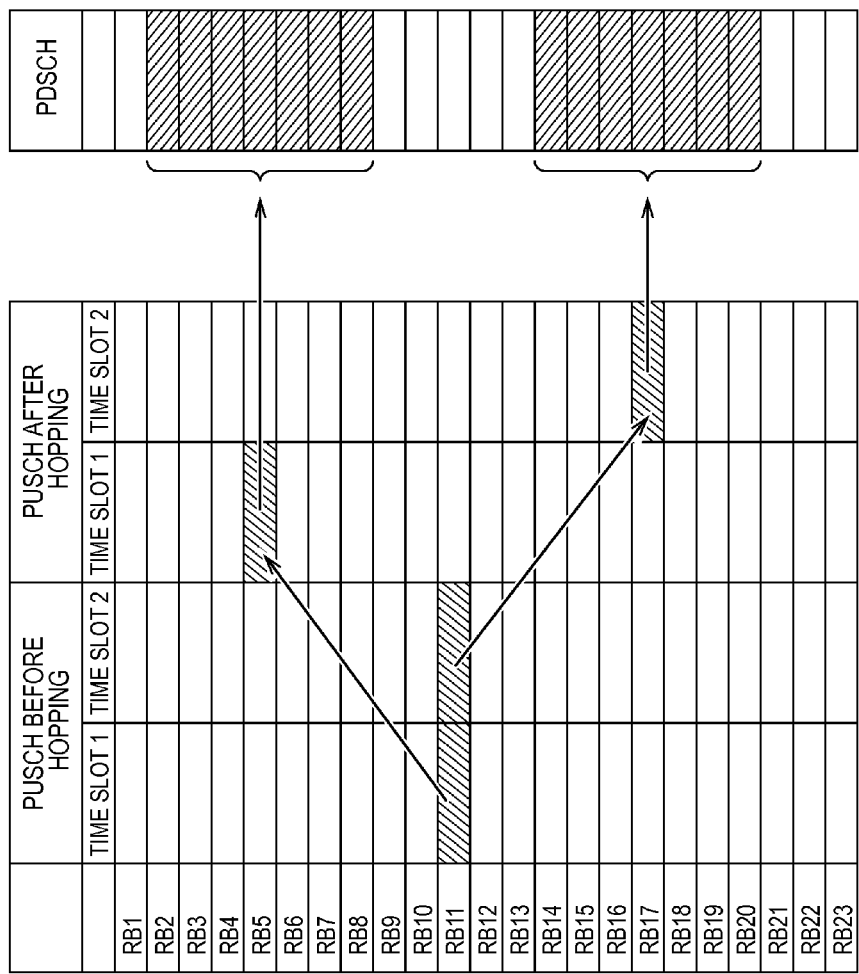
FIG. 6 is a diagram illustrating an example of a correspondence relation between a reception weight corresponding to PUSCH and a transmission weight corresponding to PDSCH according to the first embodiment.

FIG. 6 is a diagram illustrating an example of correspondence of a reception weight corresponding to PUSCH and a transmission weight corresponding to PDSCH. FIG. 6 illustrates an example when frequency hopping is applied at the time of assignment of an uplink resource block. Before the frequency hopping, a resource block (RB) 11 is assigned as a frequency band of the PUSCH. After the frequency hopping, a resource block (RB) 5 is assigned as the frequency band of the PUSCH at a time zone of the time slot 1, and a resource block (RB) 17 is assigned as the frequency band of the PUSCH at a time zone of the time slot 2.

In such a situation, a case, in which only a reception weight calculated in a past period of 1 [ms] is determined as a candidate of a transmission weight, is considered. In this case, the AAS processing unit 136 extracts a reception weight of a frequency band corresponding to the time slot 1 of the RB 5 and a reception weight of a frequency band corresponding to the time slot 2 of the RB 17. Moreover, a case, in which a reception weight is determined to be used as a transmission weight corresponding to seven frequency bands employing a frequency band corresponding to the reception weight as a center, is considered. In this case, the AAS processing unit 136 sets the reception weight of the frequency band corresponding to the time slot 1 of the RB 5 as a transmission weight with respect to frequency bands of RB 2 to RB 8 employing the RB 5 as a center among the frequency bands of the PDSCH. Furthermore, the AAS processing unit 136 sets the reception weight of the frequency band corresponding to the time slot 2 of the RB 17 as a transmission weight with respect to frequency bands of RB 14 to RB 20 employing the RB 17 as a center among the frequency bands of the PDSCH.

Since such setting of the transmission weight is employed, even when a frequency band to be used in an uplink radio signal and a frequency band to be used in a downlink radio signal do not coincide with each other, a frequency band closest to the frequency band to be used in the downlink radio signal, in other words, a reception weight of a frequency band, which has a propagation environment similar to that of the frequency band to be used in the downlink radio signal, is set as a transmission weight of the frequency band to be used in the downlink radio signal, so that it is possible to suppress failure occurring in downlink radio communication and appropriate adaptive array is possible.

Second Embodiment

Next, a second embodiment will be described with reference to the drawings. Specifically, (2.1) Configuration of radio communication system, (2.2) Operation of radio communication system, and (2.3) Operation and effect will be described. It is to be noted that the same or similar reference numerals are applied to the same or similar parts through the drawings in the following embodiments.

(2.1) Configuration of Radio Communication System

Firstly, a configuration of a radio communication system according to the second embodiment will be described in the sequence of (2.1.1) Entire schematic configuration of radio communication system, (2.1.2) Configuration of radio base station, and (2.1.3) Configuration of radio terminal.

(2.1.1) Entire Schematic Configuration of Radio Communication System

Figure 7:
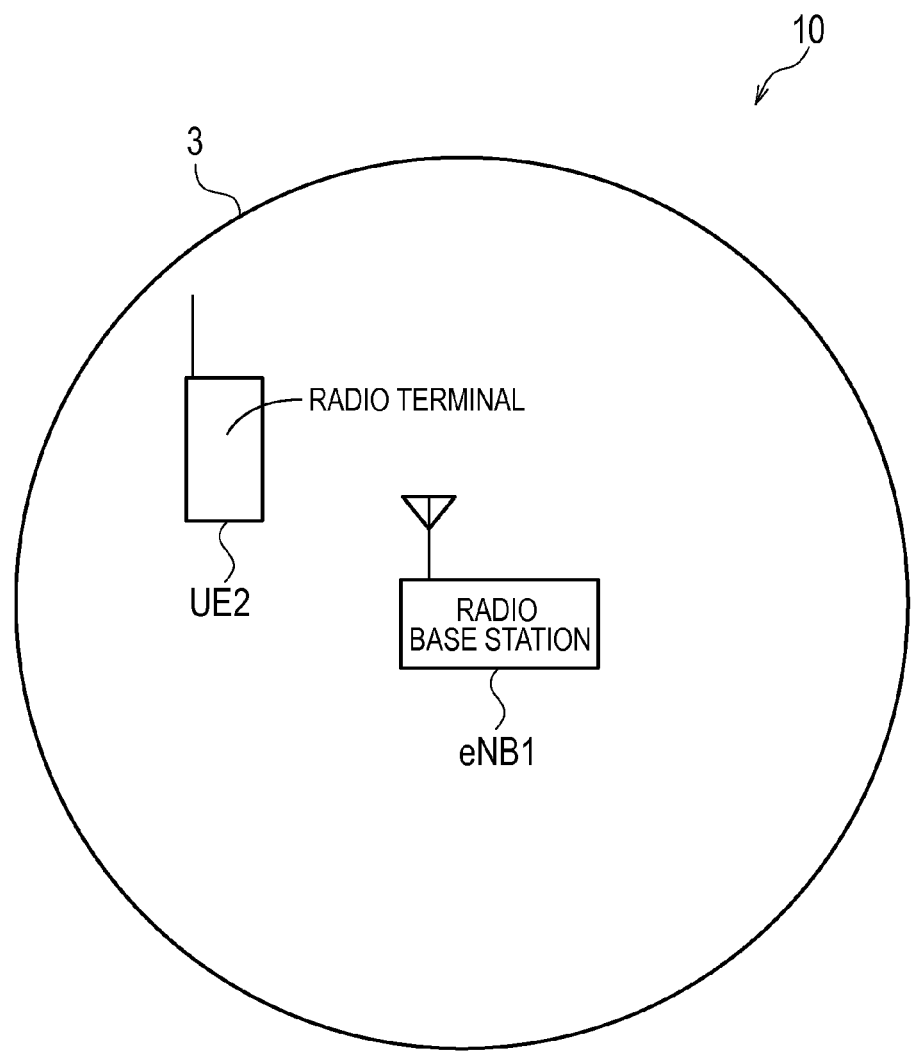
FIG. 7 is an entire schematic configuration diagram of a radio communication system according to a second embodiment.

FIG. 7 is an entire schematic configuration diagram of the radio communication system 10 according to the second embodiment.

The radio communication system 10 illustrated in FIG. 7 is a TDD-LTE radio communication system. The radio communication system 10 includes a radio base station eNB1 and a radio terminal UE2. In FIG. 7, the radio base station eNB1 constitutes E-UTRAN (Evolved-UMTS Terrestrial Radio Access Network) together with another radio base station eNB (not illustrated). The radio terminal UE2 exists in a cell 3 that is a communication available area provided by the radio base station eNB1. In addition, FIG. 7 illustrates only one radio terminal UE2. However, actually, a plurality of radio terminals UE2 exist in the cell 3.

Time division duplex is employed in radio communication between the radio base station eNB1 and the radio terminal UE2, OFDMA (Orthogonal Frequency Division Multiplexing Access) is employed in downlink radio communication, and SC-FDMA (Single Carrier Frequency Division Multiple Access) is employed in uplink radio communication. Furthermore, downlink indicates a direction from the radio base station eNB1 to the radio terminal UE2, and uplink indicates a direction from the radio terminal UE2 to the radio base station eNB1.

The radio base station eNB1 assigns a resource block (RB) to the radio terminal UE2 in the cell 3 as a radio resource.

The resource block includes a downlink resource block (downlink RB) to be used in the downlink radio communication and an uplink resource block (uplink RB) to be used in the uplink radio communication. A plurality of downlink resource blocks are arranged in a frequency direction. Similarly, a plurality of uplink resource blocks are arranged in the frequency direction.

The downlink resource block includes a control information channel (PDCCH: Physical Downlink Control CHannel) for transmitting downlink control information, and a shared data channel (PDSCH: Physical Downlink Shared CHannel) for transmitting downlink user data in a time direction.

Meanwhile, the uplink resource block includes a control information channel (PUCCH: Physical Uplink Control CHannel) for transmitting uplink control information at both ends of an entire frequency band available in the uplink radio communication, and a shared data channel (PUSCH: Physical Uplink Shared CHannel) for transmitting uplink user data at the center part thereof.

At the time of assignment of the resource block, frequency hopping is applied to change a frequency to be assigned according to a predetermined frequency hopping pattern.

Hereinafter, a description will be provided for a case in which radio communication is performed between the radio base station eNB1 and one radio terminal UE. In addition, it is assumed that the downlink resource block and the uplink resource block are assigned to the radio terminal UE2 in an initial state.

(2.1.2) Configuration of Radio Base Station

Figure 8:
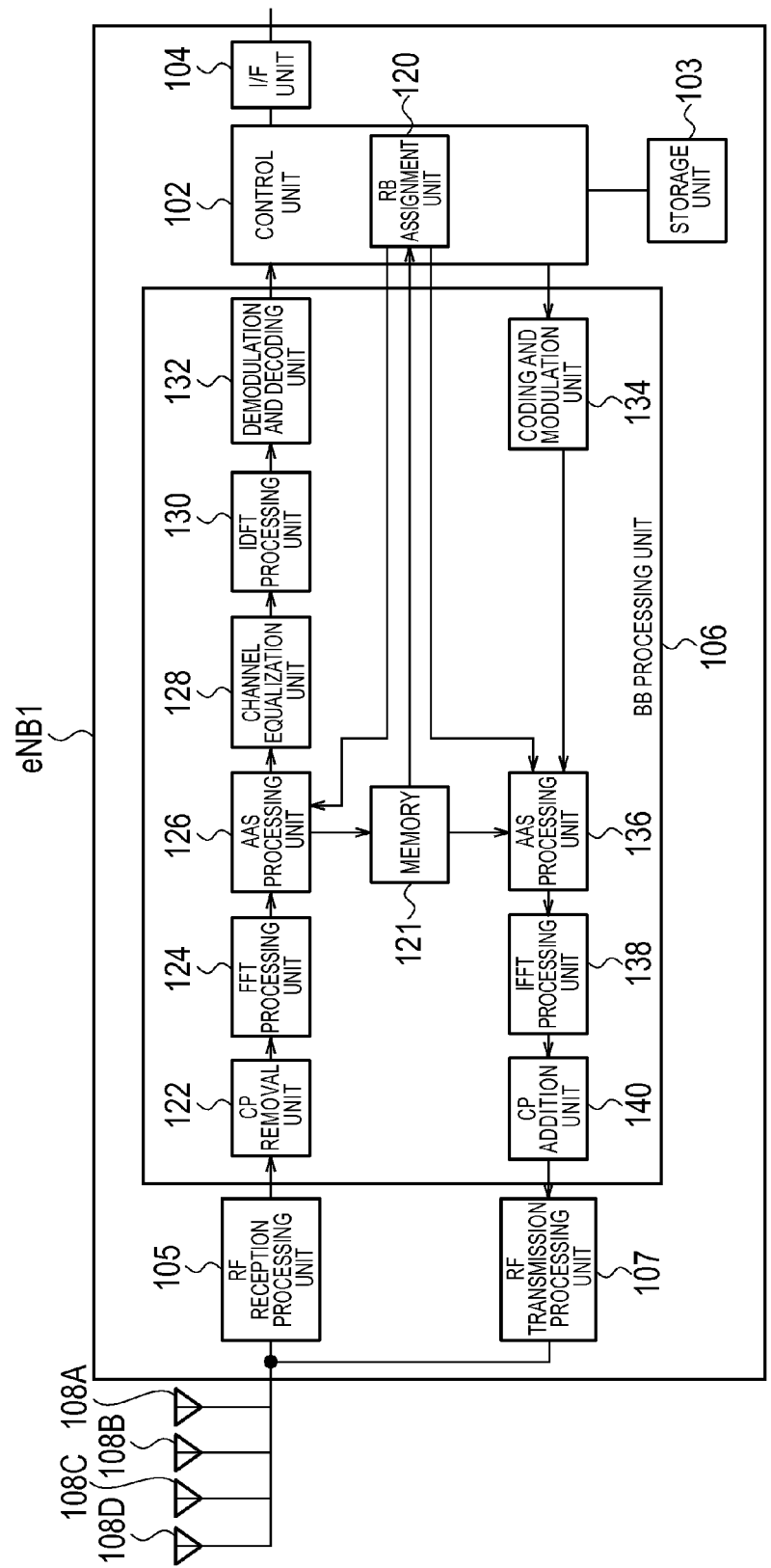
FIG. 8 is a configuration diagram of a radio base station according to the second embodiment.

FIG. 8 is a configuration diagram of the radio base station eNB1. As illustrated in FIG. 8, the radio base station eNB1 is an adaptive array scheme, and includes the control unit 102, the storage unit 103, the I/F unit 104, the radio frequency (RF) reception processing unit 105, the base band (BB) processing unit 106, the RF transmission processing unit 107, the antenna 108A, the antenna 108B, the antenna 108C, and the antenna 108D.

The control unit 102 is configured, for example, by a CPU, and controls various functions of the radio base station eNB1. The control unit 102 includes a RB assignment unit 120. The storage unit 103 is configured, for example, by a memory, and stores various types of information used for the control and the like of the radio base station eNB1. The I/F unit 104 is able to communicate with another radio base station eNB through an X1 interface. Furthermore, the I/F unit 104 is able to communicate with EPC (Evolved Packet Core), specifically, MME (Mobility Management Entity)/S-GW (Serving Gateway), through an S1 interface.

The RF reception processing unit 105 receives an uplink radio signal of a radio frequency band from the radio terminal UE2 through the antenna 108A to the antenna 108D. The RF reception processing unit 105 has LNA (Low Noise Amplifier) (not illustrated) and a mixer (not illustrated) therein. The RF reception processing unit 105 amplifies the received uplink radio signal of a radio frequency band, and converts (down-converts) the amplified signal to a base band signal. Moreover, the RF reception processing unit 105 outputs the base band signal to the BB processing unit 106.

The BB processing unit 106 includes a memory 121, a CP (Cyclic Prefix) removal unit 122, a FFT (Fast Fourier Transform) processing unit 124, an AAS (Adaptive Array System) processing unit 126, a channel equalization unit 128, an IDFT (Inverse Discrete Fourier Transform) processing unit 130, a demodulation and decoding unit 132, a coding and modulation unit 134, an AAS processing unit 136, an IFFT (Inverse Fast Fourier Transform) processing unit 138, and a CP addition unit 140.

The RB assignment unit 120 of the control unit 102 acquires an assignment value (an RB assignment value) of a resource block, which is acquired by a process of a MAC (Media Access Control) layer, in the control unit 102. The RB assignment value includes a resource block number that is identification information of a downlink resource block and an uplink resource block to be assigned to the radio terminal UE2. The RB assignment unit 120 outputs the RB assignment value to the AAS processing unit 126 and the AAS processing unit 136.

The CP removal unit 122 removes CP (Cyclic Prefix) from an input base band signal. The CP indicates duplication of an end part of an OFDM symbol, and is included in a period of a guard interval provided in order to suppress inter-symbol interference occurring by a multi-path. The FFT processing unit 124 performs fast Fourier transform on the base band signal having no CP, thereby acquiring frequency domain signals.

The AAS processing unit 126 calculates an antenna weight (a reception weight), in which a signal-to-interference noise ratio (SINR) is maximum at the time of reception of an uplink radio signal from the radio terminal UE2, with respect to each of the antenna 108A to the antenna 108D, on the basis of the frequency domain signals.

Figure 9:
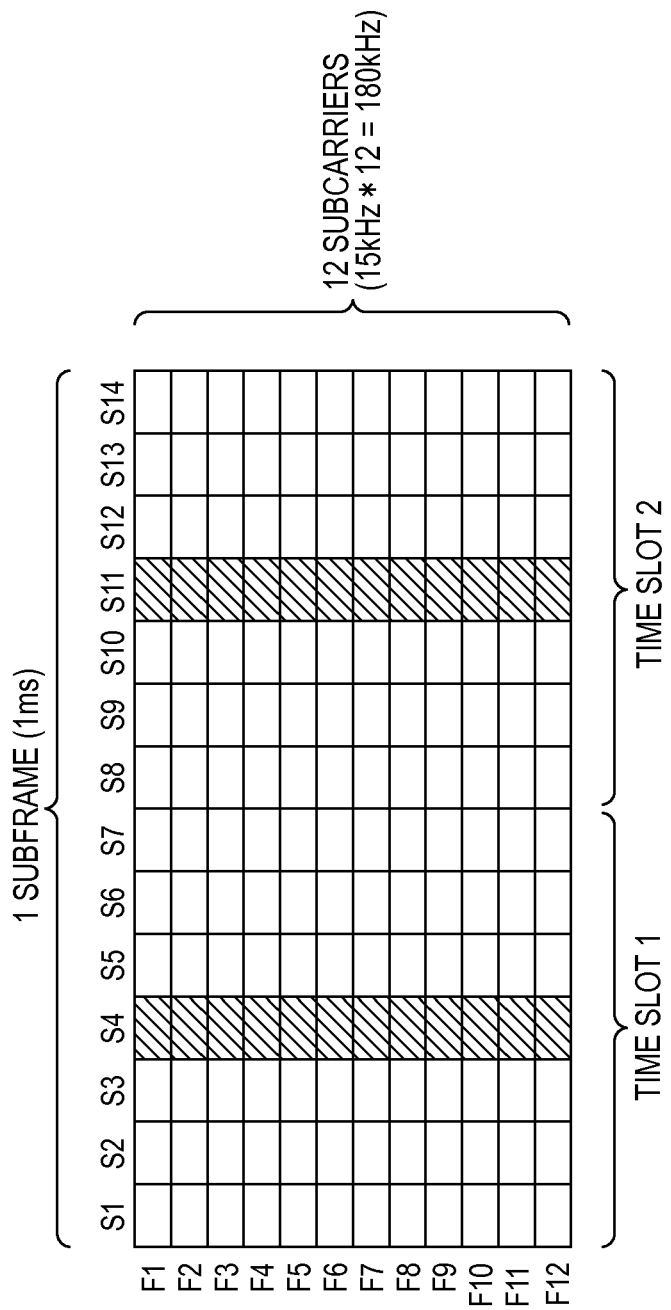
FIG. 9 is a diagram illustrating a format of PUSCH according to the second embodiment.

FIG. 9 is a diagram illustrating a format of PUSCH. As illustrated in FIG. 9, the PUSCH includes one subframe having a time length of 1 [ms] in a time direction. The subframe includes a time zone 51 to a time zone S14. Among the time zone 51 to the time zone S14, the time zone 51 to the time zone S7 constitute a former half time slot (a time slot 1) and the time zone S8 to the time zone S14 constitute a latter half time slot (a time slot 2). The central time zone S4 in the time slot 1 is used for transmitting DRS (Demodulation Reference Signal). Similarly, the central time zone S11 in the time slot 2 is used for transmitting the demodulation reference signal. In addition, also in the PDSCH, one subframe includes a former half time slot (a time slot 1) and a latter half time slot (a time slot 2).

When setting the demodulation reference signal, a Zaddoff-Chu sequence, which has small amplitude variation in a frequency direction and a time direction, is employed. The demodulation reference signal is different in each cell, and mutual correlation of the demodulation reference signal between cells is designed to be small.

Furthermore, as illustrated in FIG. 9, the PUSCH has a frequency width of 180 [kHz] in the frequency direction. Furthermore, the PUSCH includes 12 subcarriers F1 to F12 having a frequency width of 15 [kHz].

Specifically, the AAS processing unit 126 designates a frequency band of an uplink resource block assigned to the radio terminal UE2, on the basis of the RB assignment value. Moreover, the AAS processing unit 126 detects a demodulation reference signal included in a frequency domain signal corresponding to the designated frequency band of the uplink resource block. Moreover, the AAS processing unit 126 calculates reception weights of the antenna 108A to the antenna 108D, which correspond to a frequency band of PUSCH in the uplink resource block assigned to the radio terminal UE2, on the basis of the demodulation reference signal.

As illustrated in FIG. 9, in one PUSCH, the demodulation reference signal is included in the time slot 1 and the time slot 2. Accordingly, the AAS processing unit 126 calculates two reception weights for a frequency band of one PUSCH. The AAS processing unit 126 stores the calculated reception weights in the memory 121 together with information on a corresponding frequency band and information (time stamp information) on a present time.

Moreover, the AAS processing unit 126 outputs a frequency domain signal, which corresponds to the frequency band of the uplink resource block assigned to the radio terminal UE2 among the frequency domain signals from the FFT processing unit 124, to the channel equalization unit 128.

The channel equalization unit 128 performs a channel equalization process on the input frequency domain signal. The IDFT processing unit 130 performs inverse discrete Fourier transform on the signal on which the channel equalization process was performed. The demodulation and decoding unit 132 performs demodulation and decoding processes on the signal on which the inverse discrete Fourier transform was performed. In this way, data transmitted by the radio terminal UE2 is obtained. The data is output to the control unit 102.

When the data is input from the control unit 102, the coding and modulation unit 134 performs coding and modulation on the data, thereby obtaining a frequency domain signal.

The AAS processing unit 136 sets an antenna weight (a transmission weight) at the time of transmission of a downlink radio signal to the radio terminal UE2 with respect to each of the antenna 108A to the antenna 108D.

Specifically, the AAS processing unit 136 designates a time zone and a frequency band of a downlink resource block assigned to the radio terminal UE2, on the basis of the RB assignment value. PDSCH in the designated downlink resource block is PDSCH to which the transmission weight is to be set.

Next, the AAS processing unit 136 extracts reception weights, in which a time indicated by the time stamp information is in a past predetermined period, from the reception weights corresponding to the antenna 108A to the antenna 108D and stored in the memory 121. The reception weight, in which the time indicated by the time stamp information is in the past predetermined period, indicates a reception weight calculated in the past predetermined period.

The AAS processing unit 136 designates a reception weight, in which a corresponding frequency band is closest to the frequency band of the PDSCH to be set, among the extracted reception weights. Moreover, the AAS processing unit 136 sets the designated reception weight of each of the antenna 108A to the antenna 108D, as the transmission weight of each of the antenna 108A to the antenna 108D, which corresponds to the frequency band of the PDSCH to which the transmission weight is to be set. The AAS processing unit 136 synthesizes the set transmission weights with the frequency domain signal.

Furthermore, when there are a plurality of reception weights in which the corresponding frequency band is closest to the frequency band of the PDSCH to be set, the AAS processing unit 136 may set an average value of the plurality of reception weights as a transmission weight. Alternatively, the AAS processing unit 136 may set the latest one of the plurality of reception weights as a transmission weight.

In addition, when a frequency difference between the frequency band corresponding to the designated reception weight and the frequency band of the PDSCH to be set is equal to or more than a predetermined value, the AAS processing unit 136 may not set the transmission weights of the antenna 108A to the antenna 108D, which correspond to the frequency band of the PDSCH to which the transmission weight is to be set.

Furthermore, when the radio terminal UE2 has only one antenna and MIMO (Multi Input Multi Output) is employed in downlink radio communication as multi-stream communication, the AAS processing unit 136 performs the following process. That is, when precoding corresponding to the MIMO is performed in the coding and modulation unit 134, the AAS processing unit 136 uses a reception weight as a transmission weight (a first transmission weight) with respect to one layer, uses the reception weight as a second transmission weight perpendicular to the first transmission weight with respect to the other layer, and performs spatial division multiple access (SDMA) synthesis for the first/second transmission weights and a signal. For example, in the case in which the number of antenna elements is K in the radio base station eNB1 and the number of layers is two, when a first transmission weight of a Kth antenna element (an element (k)) calculated based on a reception weight is defined as WTX1(k), a second transmission weight WTX2(k) is obtained by Equation (3) below. However, a plurality of second transmission weights can be obtained by the number of the antenna elements in the radio base station eNB1. Synthesis of the signal X1 of the layer 1 and the first transmission weight WTX1(k) of the element (k), and synthesis of the signal X2 of the layer 2 and the second transmission weight WTX2(k) of the element (k) are performed by Equation (4) below, so that a synthesis weight is W(k).

[Equation. 3]

$$W_{TX2}(k) = \frac{W_{TX1}(k)}{|W_{TX1}(k)|} \exp\left(j * 2\pi * \frac{k}{K}\right) \quad \text{Equation 3}$$

[Equation 4]

$$W(k) = \frac{W_{TX1}(k) * X_1}{\sqrt{2}} + \frac{W_{TX2}(k) * X_2}{\sqrt{2}} \quad \text{Equation 4}$$

The AAS processing unit 136 performs weighting for the frequency domain signal, on the basis of the set transmission weight. Moreover, the AAS processing unit 136 outputs the weighted frequency domain signal to the IFFT processing unit 138.

The IFFT processing unit 138 performs inverse fast Fourier transform on the weighted frequency domain signal, thereby obtaining a base band signal. The CP addition unit 140 adds CP to the input base band signal. The CP addition unit 140 outputs the base band signal having the CP added thereto to the RF transmission processing unit 107.

The RF transmission processing unit 107 has a mixer (not illustrated) and a power amplifier (not illustrated) therein. The RF transmission processing unit 107 converts (up-converts) the base band signal having the CP added thereto to a downlink radio signal of a radio frequency band. Moreover, the RF transmission processing unit 107 amplifies the downlink radio signal of a radio frequency band, and transmits the amplified downlink radio signal of a radio frequency band through the antenna 108A to the antenna 108D in which the transmission weights are set.

Then, the RB assignment unit 120 of the control unit 102 reads information on a frequency band that corresponds to a reception weight, in which a time indicated by the time stamp information is in a past predetermined period, among the reception weights corresponding to the antenna 108A to the antenna 108D and stored in the memory 121. The read information on the frequency band indicates the frequency band of the PUSCH for which the reception weight was calculated.

The RB assignment unit 120 performs re-assignment of a downlink resource block, on the basis of the read information on the frequency band.

Specifically, the RB assignment unit 120 sets priority such that a higher assignment priority is set to a downlink resource block of a frequency band closer to the frequency band of the PUSCH for which the reception weight was calculated, wherein the frequency band of the PUSCH is indicated by the read information on the frequency band. The RB assignment unit 120 selects a downlink resource block according to the set priority. Moreover, when the selected downlink resource block is not in use, the RB assignment unit 120 determines to assign the downlink resource block.

Meanwhile, when the selected downlink resource block was already used, the RB assignment unit 120 selects a downlink resource block having a second highest priority next to the resource block. Then, similarly to the above, a process after the determination regarding whether the selected downlink resource block is not in use is repeated.

The RB assignment unit 120 outputs a new RB assignment value, which corresponds to a downlink resource block determined to be assigned, to the AAS processing unit 136. Furthermore, the new RB assignment value is sent to the radio terminal UE2 as control information.

When the new RB assignment value is input, the AAS processing unit 136 performs the same processes as those described above. That is, the AAS processing unit 136 designates a time zone and a frequency band of a downlink resource block newly assigned to the radio terminal UE2, on the basis of the RB assignment value. PDSCH in the designated downlink resource block is PDSCH to which the transmission weight is to be set.

Next, the AAS processing unit 136 extracts reception weights, in which a time indicated by the time stamp information is in a past predetermined period, from the reception weights corresponding to the antenna 108A to the antenna 108D and stored in the memory 121.

The AAS processing unit 136 designates a reception weight, in which a corresponding frequency band is closest to a frequency band of PDSCH in the newly assigned downlink resource block, among the extracted reception weights. Moreover, the AAS processing unit 136 sets the designated reception weight for each of the antenna 108A to the antenna 108D as a transmission weight of each of the antenna 108A to the antenna 108D, which corresponds to the frequency band of the PDSCH in the newly assigned downlink resource block. The AAS processing unit 136 performs a weighting process to synthesize the set transmission weight with the frequency domain signal. Moreover, the AAS processing unit 136 outputs the weighted frequency domain signal to the IFFT processing unit 138.

Then, the IFFT processing unit 138 performs inverse fast Fourier transform on the weighted frequency domain signal, thereby obtaining a base band signal. The CP addition unit 140 adds CP to the input base band signal. The CP addition unit 140 outputs the base band signal having the CP added thereto to the RF transmission processing unit 107.

The RF transmission processing unit 107 converts (up-converts) the base band signal having the CP added thereto to a downlink radio signal of a radio frequency band. Moreover, the RF transmission processing unit 107 amplifies the downlink radio signal of a radio frequency band, and transmits the amplified downlink radio signal of a radio frequency band through the antenna 108A to the antenna 108D in which the transmission weights are set.

(2.1.3) Configuration of Radio Terminal

Figure 10:
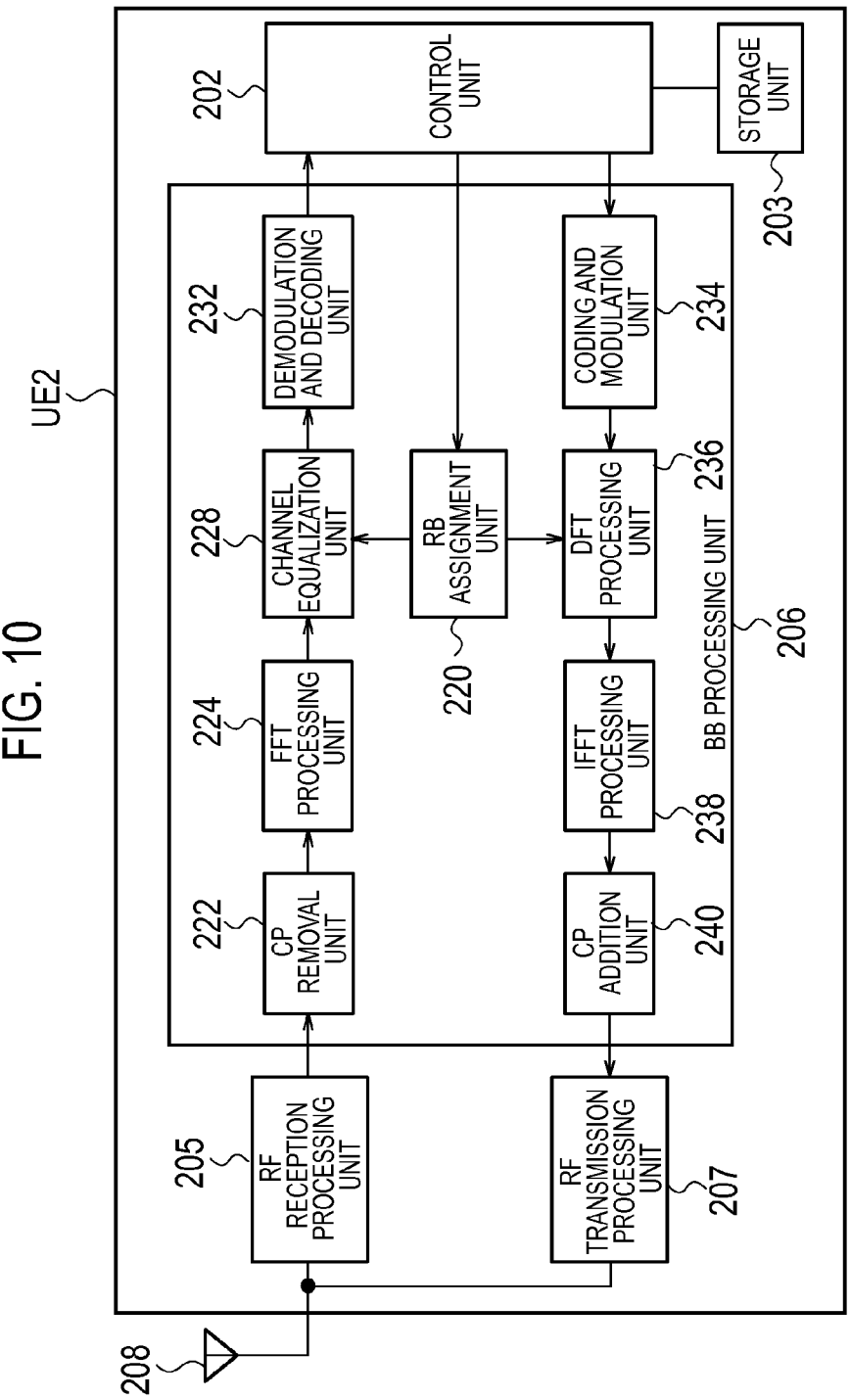
FIG. 10 is a configuration diagram of a radio terminal according to the second embodiment.

FIG. 10 is a configuration diagram of the radio terminal UE2. As illustrated in FIG. 10, the radio terminal UE2 includes the control unit 202, the storage unit 203, the radio frequency (RF) reception processing unit 205, the base band (BB) processing unit 206, the RF transmission processing unit 207, and the antenna 208.

The control unit 202 is configured, for example, by a CPU, and controls various functions of the radio terminal UE2. The storage unit 203 is configured, for example, by a memory, and stores various types of information used for the control and the like of the radio terminal UE2.

The RF reception processing unit 205 receives a downlink radio signal of a radio frequency band from the radio base station eNB1 through the antenna 208. The RF reception processing unit 205 has LNA (Low Noise Amplifier) (not illustrated) and a mixer (not illustrated) therein. The RF reception processing unit 205 amplifies the received downlink radio signal of a radio frequency band, and converts (down-converts) the amplified signal to a base band signal. Moreover, the RF reception processing unit 205 outputs the base band signal to the BB processing unit 206.

The BB processing unit 206 includes a RB assignment unit 220, a CP removal unit 222, a FFT processing unit 224, a channel equalization unit 228, a demodulation and decoding unit 232, a coding and modulation unit 234, a DFT processing unit 236, an IFFT processing unit 238, and a CP addition unit 240.

The RB assignment unit 220 receives an assignment value (an RB assignment value) of a resource block, which is acquired by a process of a MAC layer, in the control unit 202. The control unit 202 is able to recognize an assigned resource block, on the basis of assignment information of a resource block from the radio base station eNB1 when the radio terminal UE2 is connected to the radio base station eNB1. As described above, the RB assignment value includes a resource block number that is identification information of a downlink resource block and an uplink resource block to be assigned to the radio terminal UE2. The RB assignment unit 220 outputs the RB assignment value to the channel equalization unit 228 and the DFT processing unit 236.

The CP removal unit 222 removes CP from an input base band signal. The FFT processing unit 224 performs fast Fourier transform on the base band signal having no CP, thereby acquiring frequency domain signals.

The channel equalization unit 228 designates a frequency band of a downlink resource block assigned to the radio terminal UE2, on the basis of the RB assignment value from the RB assignment unit 220. Moreover, the channel equalization unit 228 performs a channel equalization process on a frequency domain signal, which corresponds to the frequency band of the downlink resource block assigned to the radio terminal UE2, among the frequency domain signals from the FFT processing unit 224. The demodulation and decoding unit 232 performs demodulation and decoding processes on the signal on which the channel equalization process was performed. In this way, data transmitted by the radio base station eNB1 is obtained. The data is output to the control unit 202.

When the data is input from the control unit 202, the coding and modulation unit 234 performs coding and modulation on the data, thereby obtaining a frequency domain signal. The DFT processing unit 236 designates a frequency band of an uplink resource block assigned to the radio terminal UE2, on the basis of the RB assignment value from the RB assignment unit 220. Moreover, the DFT processing unit 236 performs discrete Fourier transform on the frequency domain signal. The IFFT processing unit 238 performs inverse fast Fourier transform on the signal on which the discrete Fourier transform was performed, thereby obtaining a base band signal. The CP addition unit 240 adds CP to the input base band signal. The CP addition unit 240 outputs the base band signal having the CP added thereto to the RF transmission processing unit 207.

The RF transmission processing unit 207 has a mixer (not illustrated) and a power amplifier (not illustrated) therein. The RF transmission processing unit 207 converts (up-converts) the base band signal having the CP added thereto to an uplink radio signal of a radio frequency band. Moreover, the RF transmission processing unit 207 amplifies the uplink radio signal of a radio frequency band, and transmits the amplified uplink radio signal of a radio frequency band through the antenna 208.

(2.2) Operation of Radio Communication System

FIG. 11 is a sequence diagram illustrating the operation of the radio communication system 10. In step S101, the radio terminal UE2 transmits an uplink radio signal of a radio frequency band. The radio base station eNB1 receives the uplink radio signal of a radio frequency band.

In step S102, the radio base station eNB1 detects a demodulation reference signal included in the received uplink radio signal.

In step S103, the radio base station eNB1 calculates a reception weight of each of the antenna 108A to the antenna 108D, which correspond to the frequency band of PUSCH in an uplink resource block assigned to the radio terminal UE2, on the basis of the demodulation reference signal. Moreover, the radio base station eNB1 stores the calculated reception weights of the antenna 108A to the antenna 108D.

In step S104, the radio base station eNB1 designates a reception weight, in which a corresponding frequency band is closest to the frequency band of PDSCH to be set, among the stored reception weights of the antenna 108A to the antenna 108D, the reception weight being calculated in a past predetermined period. Moreover, the radio base station eNB1 sets the designated reception weight as the transmission weight of each of the antenna 108A to the antenna 108D.

In step S105, the radio base station eNB1 transmits a downlink radio signal of a radio frequency band from each of the antenna 108A to the antenna 108D in which the transmission weight is set. The radio terminal UE2 receives the downlink radio signal of a radio frequency band.

In step S106, the radio base station eNB1 reads information on a frequency band corresponding to the stored reception weight.

In step S107, the radio base station eNB1 sets priority such that a higher assignment priority is set to a downlink resource block of a frequency band closer to the frequency band of the PUSCH for which the reception weight was calculated, wherein the frequency band of the PUSCH is indicated by the read information on the frequency band. Moreover, the RB assignment unit 120 selects a downlink resource block according to the set priority, and determines to assign the selected downlink resource block when the selected downlink resource block is not in use.

In step S108, the radio base station eNB1 transmits assignment information, which includes a RB assignment value corresponding to the downlink resource block determined to be assigned, to the radio terminal UE2. The radio terminal UE2 receives the assignment information and recognizes a downlink resource block to be newly assigned.

In step S109, the radio base station eNB1 designates a reception weight, in which a corresponding frequency band is closest to the frequency band of PDSCH in the newly assigned downlink resource block, among the stored reception weights of the antenna 108A to the antenna 108D, the reception weight being calculated in a past predetermined period. Moreover, the radio base station eNB1 sets the designated reception weight as the transmission weight of each of the antenna 108A to the antenna 108D.

In step S110, the radio base station eNB1 transmits a downlink radio signal of a radio frequency band from each of the antenna 108A to the antenna 108D in which the transmission weight is set. The radio terminal UE2 receives the downlink radio signal of a radio frequency band.

(2.3) Operation and Effect

As described above, according to the second embodiment, when an uplink radio signal of a radio frequency band is received from the radio terminal UE2, the radio base station eNB1 calculates and stores a reception weight of each of the antenna 108A to the antenna 108D, on the basis of a demodulation reference signal included in the uplink radio signal. Moreover, the radio base station eNB1 reads information on a frequency band corresponding to the stored reception weight, selects a downlink resource block according to priority in which a higher assignment priority is set to a downlink resource block of a frequency band closer to the frequency band of PUSCH for which a reception weight was calculated, and assigns the selected downlink resource block when the selected downlink resource block is not in use, wherein the frequency band of the PUSCH is indicated by the information on the frequency band.

FIG. 12 is a diagram illustrating an example of correspondence of a reception weight corresponding to PUSCH and a transmission weight corresponding to PDSCH. FIG. 12 illustrates an example when frequency hopping is applied at the time of assignment of an uplink resource block. Before the frequency hopping, a resource block (RB) 11 is assigned as a frequency band of the PUSCH. After the frequency hopping, a resource block (RB) 5 is assigned as the frequency band of the PUSCH at a time zone of the time slot 1, and a resource block (RB) 17 is assigned as the frequency band of the PUSCH at a time zone of the time slot 2.

In such a situation, a case, in which only a reception weight calculated in a past period of 1 [ms] is determined as a candidate of a transmission weight, is considered. In this case, the AAS processing unit 136 extracts a reception weight of a frequency band corresponding to the time slot 1 of the RB 5 and a reception weight of a frequency band corresponding to the time slot 2 of the RB 17. Moreover, a case, in which a reception weight is determined to be used as a transmission weight corresponding to frequency bands in the vicinity of a frequency band corresponding to the reception weight, is considered.

In this case, the RB assignment unit 120 assigns the time slot 1 of a RB 3, which is a frequency band in the vicinity of the RB 5, and the time slot 2 of the RB 5 to the radio terminal UE2, and assigns the time slot 1 of a RB 15, which is a frequency band in the vicinity of the RB 17, and the time slot 2 of the RB 17 to the radio terminal UE2, in the frequency band of the PDSCH. Moreover, the AAS processing unit 136 sets the reception weight of the frequency band corresponding to the time slot 1 of the RB 5 as a transmission weight with respect to the time slot 1 of the RB 3 and the time slot 2 of the RB5. Furthermore, the AAS processing unit 136 sets the reception weight of the frequency band corresponding to the time slot 2 of the RB 17 as a transmission weight with respect to the time slot 1 of the RB 15 and the time slot 2 of the RB 17.

Through the assignment of the downlink resource block and the setting of the transmission weight, it is possible to bring a frequency band used in a downlink radio signal closer, as much as possible, to a frequency band for which a reception weight was calculated, so that a propagation environment of the frequency band for which the reception weight was calculated approximates to a propagation environment of the frequency band to be used in the downlink radio signal. Consequently, even when the calculated reception weight is set as a transmission weight for the frequency band to be used in the downlink radio signal, it is possible to suppress failure occurring in downlink radio communication and appropriate adaptive array is possible.

Other Embodiments

Thus, the present invention has been described with the embodiment. However, it should not be understood that those descriptions and drawings constituting a part of the present disclosure limit the present invention. Further, various substitutions, examples, or operational techniques shall be apparent to a person skilled in the art, on the basis of this disclosure.

In the aforementioned embodiments, the radio base station eNB1 calculates a reception weight on the basis of a demodulation reference signal. However, the reception weight may be set based on other signals included in an uplink radio signal.

In the aforementioned embodiments, the TDD-LTE radio communication system was described. However, the present invention can be applied in the same manner to all types of radio communication systems in which a frequency band of an uplink radio signal to be assigned to a radio terminal is different from a frequency band of a downlink radio signal, and up/down asymmetrical communication is employed.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-146977 (filed on Jun. 28, 2010) and Japanese Patent Application No. 2010-146978 (filed on Jun. 28, 2010) are incorporated in the present specification by reference.

INDUSTRIAL APPLICABILITY

According to the present invention, an antenna weight of a frequency band, which has a propagation environment similar to that of a frequency band to be used in a downlink radio signal, can be set in a frequency band to be used in the downlink radio signal, and appropriate adaptive array is possible.

The invention claimed is:

1. A radio base station employing an adaptive array scheme, which transmits and receives a radio signal to and from a radio terminal using a plurality of antennas, comprising:
a processor that calculates antenna weights for each of a plurality of uplink frequency bands, on the basis of respective reference signals of each of the plurality of uplink frequency bands in an uplink radio signal; and
a memory that stores the antenna weights, wherein
the processor is configured to be communicatively coupled to the plurality of antennas,
the processor sets a beam-forming antenna weight for a downlink frequency band to be used in a downlink radio signal, and
the processor sets an antenna weight for an uplink frequency band which is closest to the downlink frequency band among the antenna weights as the beam-forming antenna weight for the downlink frequency band when the downlink frequency band is not the same as the uplink frequency band.

2. The radio base station according to claim 1, wherein the processor calculates the antenna weights for each of the plurality of uplink frequency bands, on the basis of respective reference signals of each of the plurality of uplink frequency bands belonging to a predetermined time zone in the uplink radio signal.

3. The radio base station according to claim 2, wherein the predetermined time zone includes a former half time slot and a latter half time slot, and
the processor calculation unit calculates an antenna weight of a frequency band corresponding to a first reference signal, on the basis of the first reference signal belonging to a time zone of the former half time slot in the uplink radio signal, and calculates an antenna weight of a frequency band corresponding to a second reference signal, on the basis of the second reference signal belonging to a time zone of the latter half time slot in the uplink radio signal.

4. The radio base station according to claim 1, wherein the processor calculates an antenna weight corresponding to a predetermined frequency band, on the basis of each of a plurality of reference signals belonging to the predetermined frequency band in a past predetermined period.

5. The radio base station according to claim 1, wherein the processor setting unit sets a first antenna weight in a frequency band of a downlink radio signal corresponding to a first data stream, and sets a second antenna weight, in which a null is placed in a direction of a beam corresponding to the first antenna weight, in a frequency band of a downlink radio signal corresponding to a second data stream, when the radio terminal has one antenna and downlink radio communication is multi-stream communication.

6. The radio base station according to claim 1, wherein the frequency band to be used in the downlink radio signal is not the same as any of the uplink frequency bands.

7. A communication control method used in a radio base station employing an adaptive array scheme, which transmits and receives a radio signal to and from a radio terminal using a plurality of antennas, comprising the steps of:
calculating antenna weights for each of a plurality of uplink frequency bands in an uplink radio signal based on respective reference signals of each of the plurality of uplink frequency bands;
storing the antenna weights, and
setting a beam-forming antenna weight in a downlink frequency band to be used in a downlink radio signal, wherein
in the setting of the beam-forming antenna weight, an antenna weight for an uplink frequency band which is closest to the downlink frequency band among the antenna weights plurality is set as the beam-forming antenna weight for the downlink frequency band when the downlink frequency band is not the same as the uplink frequency band.

8. The communication control method according to claim 7, wherein
the frequency band to be used in the downlink radio signal is not the same as any of the uplink frequency bands.

9. A radio base station employing an adaptive array scheme, which transmits and receives a radio signal to and from a radio terminal using a plurality of antennas, comprising:
a processor that calculates antenna weights for each of a plurality of uplink frequency bands, on the basis of respective reference signals of each of the plurality of uplink frequency bands in an uplink radio signal; wherein
the processor is configured to be communicatively coupled to the plurality of antennas,
the processor assigns a frequency band to be used in a downlink radio signal, and
the processor sets a higher priority to a frequency band assigned to be used in the downlink radio signal, as the frequency band is closer to the uplink frequency band among the plurality of uplink frequency bands for which the antenna weight has been calculated by the processor.

10. The radio base station according to claim 9, wherein the processor sets an antenna weight for the frequency band to be used in the downlink radio signal, and
the processor sets an antenna weight, which corresponds to a frequency band in which the corresponding frequency band is closest to the frequency band to be used in the downlink radio signal assigned by the processor among the antenna weights calculated by the processor, in the frequency band to be used in the downlink radio signal assigned by the processor.

11. The radio base station according to claim 10, wherein, the processor sets a first antenna weight in a frequency band of a downlink radio signal corresponding to a first data stream, and sets a second antenna weight, in which a null is placed in a direction of a beam corresponding to the first antenna weight, in a frequency band of a downlink radio signal corresponding to a second data stream, when the radio terminal has one antenna and downlink radio communication is multi-stream communication.

12. The radio base station according to claim 9, wherein the processor calculates the antenna weights for each of the plurality of uplink frequency bands, on the basis of respective reference signals of each of the plurality of uplink frequency bands belonging to a predetermined time zone in the uplink radio signal.

13. The radio station according to claim 12, wherein the predetermined time zone includes a former half time slot and a latter half time slot, and the processor calculates an antenna weight of a frequency band corresponding to a first reference signal, on the basis of the first reference signal belonging to a time zone of the former half time slot in the uplink radio signal, and calculates an antenna weight of a frequency band corresponding to a second reference signal, on the basis of the second reference signal belonging to a time zone of the latter half time slot in the uplink radio signal.

14. The radio base station according to claim 9, wherein the processor calculates an antenna weight corresponding to a predetermined frequency band, based on each of a plurality of reference signals belonging to the predetermined frequency band in a past predetermined period.

15. A communication control method used in a radio base station employing an adaptive array scheme, which transmits and receives a radio signal to and from a radio terminal using a plurality of antennas, comprising the steps of:

calculating antenna weights for each of a plurality of uplink frequency bands in an uplink radio signal based on respective reference signals of each of the plurality of uplink frequency bands; and assigning a frequency band to be used in a downlink radio signal, wherein in the step of assigning the frequency band, increasing a priority to a frequency band assigned to be used in the downlink radio signal, as the frequency band is closer to the uplink frequency band among the plurality of uplink frequency bands for which the antenna weight has been calculated.

* * * * *